United States Patent
Ferguson

(10) Patent No.: US 12,437,916 B2
(45) Date of Patent: Oct. 7, 2025

(54) SINGLE PACKAGE, DUAL CURRENT TRANSFORMER FOR LOAD AND RESIDUAL CURRENT MEASUREMENT

(71) Applicant: VERTIV CORPORATION, Columbus, OH (US)

(72) Inventor: Kevin R. Ferguson, Dublin, OH (US)

(73) Assignee: VERTIV CORPORATION, Westerville, OH (US)

( * ) Notice: Subject to any disclaimer, the term of this patent is extended or adjusted under 35 U.S.C. 154(b) by 36 days.

(21) Appl. No.: 17/972,876

(22) Filed: Oct. 25, 2022

(65) Prior Publication Data

US 2023/0127478 A1 Apr. 27, 2023

Related U.S. Application Data

(60) Provisional application No. 63/271,981, filed on Oct. 26, 2021.

(51) Int. Cl.
*G01R 19/00* (2006.01)
*H01F 27/02* (2006.01)
*H01F 38/30* (2006.01)

(52) U.S. Cl.
CPC ......... *H01F 38/30* (2013.01); *G01R 19/0092* (2013.01); *H01F 27/02* (2013.01)

(58) Field of Classification Search
CPC ... G01R 15/183; G01R 19/0092; H01F 38/30; H01F 2038/305; H01F 2027/297; H01F 27/02; H01F 27/027
See application file for complete search history.

(56) References Cited

U.S. PATENT DOCUMENTS

| 2003/0222746 | A1 | 12/2003 | Fushimi | |
|---|---|---|---|---|
| 2008/0284410 | A1* | 11/2008 | Perez | G01R 15/142 324/120 |
| 2012/0221278 | A1* | 8/2012 | Cook | G01R 21/133 324/127 |
| 2014/0028287 | A1* | 1/2014 | Brookes | H01F 38/32 336/107 |
| 2019/0324064 | A1 | 10/2019 | Kinsella | |
| 2021/0351744 | A1* | 11/2021 | Marangoni | H02S 50/10 |

FOREIGN PATENT DOCUMENTS

| CN | 203606413 U | | 5/2014 |
|---|---|---|---|
| CN | 210271978 U | * | 4/2020 |
| CN | 110571021 B | | 1/2022 |

(Continued)

OTHER PUBLICATIONS

European Search Report received in EP Application No. 22888129. 8, Aug. 25, 2025, 12 pages.

*Primary Examiner* — Lee E Rodak
*Assistant Examiner* — Demetrius R Pretlow
(74) *Attorney, Agent, or Firm* — Suiter Swantz IP

(57) ABSTRACT

The present disclosure is a system and method for measuring both load current and residual current within an electronic component. The electronic component includes a first toroidal core for measuring load current and a second toroidal core for measuring residual current, all enclosed within a housing. The system facilitates the measurement of load current and residual current in a small form factor and may be configured to replace legacy electronic components that measure only load current.

20 Claims, 4 Drawing Sheets

(56) References Cited

FOREIGN PATENT DOCUMENTS

| | | | | |
|---|---|---|---|---|
| DE | 2710827 C3 | 12/1980 | | |
| DE | 3543948 C2 | 8/1993 | | |
| DE | 102013100246 A1 | * 7/2014 | ........... | G01R 15/183 |
| EP | 3340272 B1 | 6/2018 | | |
| GB | 169093 A | 9/1921 | | |
| GB | 2524312 A | 9/2015 | | |
| JP | 2003061243 A | 2/2003 | | |
| JP | 4249594 B2 | 4/2009 | | |
| JP | 2013128057 A | 6/2013 | | |
| KR | 1020200096857 A | 8/2020 | | |
| WO | 2018008884 A1 | 1/2018 | | |

* cited by examiner

SINGLE PACKAGE, DUAL CURRENT TRANSFORMER FOR LOAD AND RESIDUAL CURRENT MEASUREMENT

PRIORITY

This application claims priority to U.S. Provisional Application No. 63/271,981 filed Oct. 26, 2021, which is incorporated by reference herein in its entirety. Any and all applications for which a foreign or domestic priority claim is identified in the Application Data Sheet as filed with the present application are hereby incorporated by reference under 37 CFR 1.57.

TECHNICAL FIELD

The present disclosure relates generally to transformers, and more particularly to current transformers for measuring load current and residual current.

BACKGROUND

Transformers are passive electronic components that facilitate the transfer of electricity from one electrical circuit to another electrical circuit via two wire coils (e.g., a primary coil and a secondary coil) via induction of electromotive force. Transformers are typically used in alternating current (AC) environments and function to alter and/or measure changes in voltage and/or current between electrical circuits.

Current transformers are used primarily to measure load current in high-current systems, such as power distribution units (PDUs), where it would be impractical to use an ammeter for measuring current. Current transformers typically employ a secondary coil arranged as a toroidal coil arranged around a power cable (e.g., the primary coil). In this arrangement, the current induced within the secondary coil is considerably lower than the current flowing through the power cable. Leads from the secondary coil are then coupled to an ammeter or other current-measuring device to determine the current within the secondary coil, from which the current through the primary cable can be determined, based on the relationship (e.g., number of coil loops) between the primary coil and the secondary coil.

If the primary coil is configured to be looped back through the toroidal coil, the current transformer can no longer measure load current, but instead becomes a residual current transformer/monitor, measuring the differences in current between the incoming current and outgoing current within the primary coil. Residual current monitors configured in this manner are often used for detecting differences in return current that can occur during a fault current event. For example, residual current protective devices containing residual current monitors, such as ground fault interrupter (GFI) outlets, can detect fault currents, and act to shut off electrical power, reducing the risk of electrocution.

Load current transformers and residual current transformers often require metal cores and windings that are difficult to miniaturize within small form-factors. In particular, electronic devices that are modified to include current residual transformers may have difficulty in fitting the current residual transformer within the small form-factor.

Accordingly, it may be advantageous for a system and method to remedy the shortcomings of the conventional approaches identified above.

SUMMARY

Accordingly, the present disclosure is directed to a system and method for measuring both load current and residual current within a single electronic component. The electronic component includes a first toroidal core for measuring load current, and a second toroidal core for measuring residual current, all enclosed within a housing. The system facilitates the measurement of load current and residual current in a small form factor, and may be configured to replace legacy electronic components that measure only load current.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
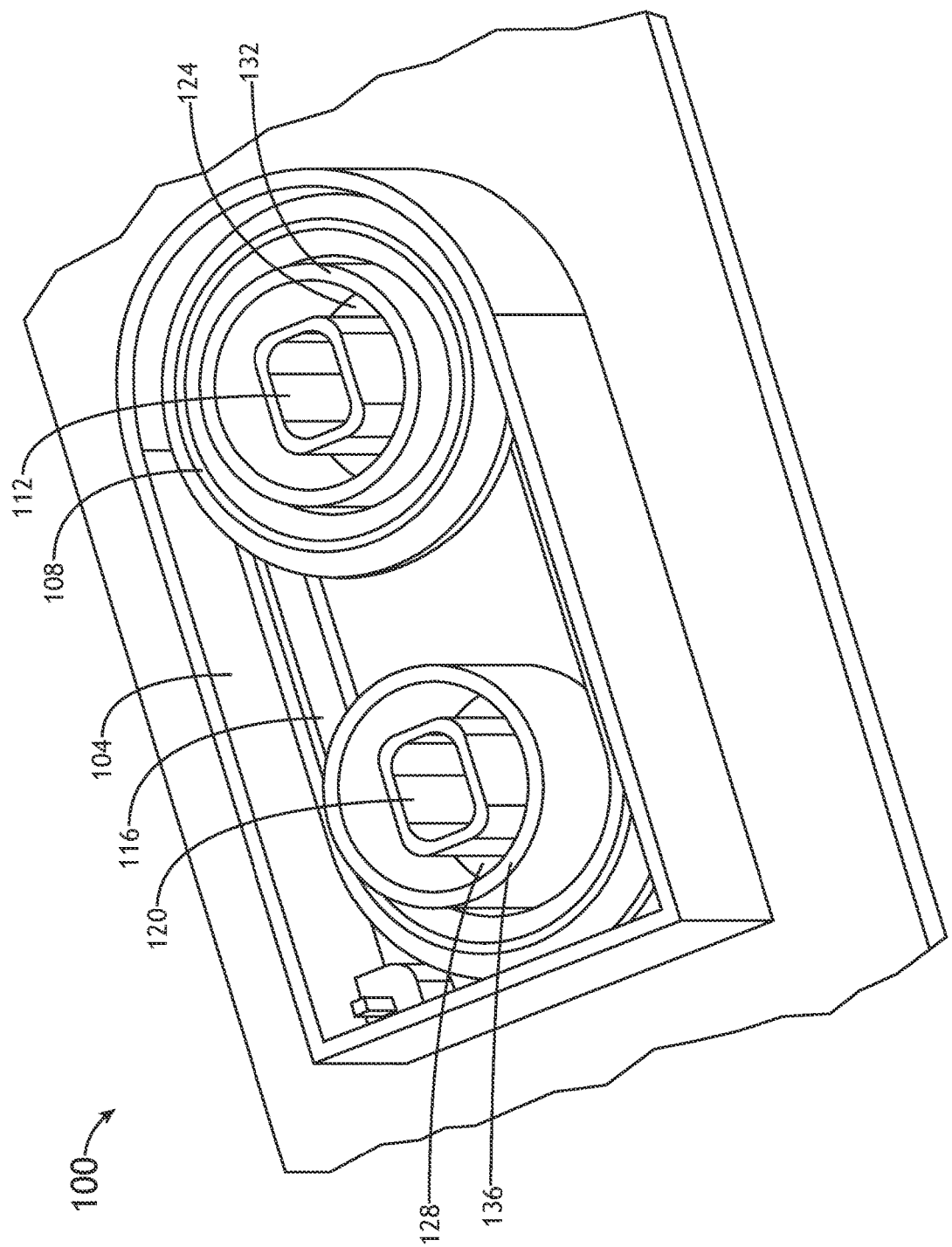
FIG. 1A depicts a diagram of a system for measuring current load and residual load within a housing in accordance with an embodiment of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1A, a system 100 for measuring current load and residual load within a housing 104 is presented. The system 100 for measuring current load and residual load may be configured as a combination of a load current transformer and a residual Type A transformer, which may include a first toroidal core 108 configured to encircle a first conductor 112, and a second toroidal core 116 configured to encircle both the first conductor 112 and a second conductor 120. The first conductor 112 and the second conductor 120 may be coupled to a circuit. As described herein, the first toroidal core 108 is configured to detect load current, whereas the second toroidal core 116 is configured to detect residual current. The system 100 combines standard and residual current Type A current transformer sensors into a single, compact, monolithic package.

It is contemplated that the system 100 may be configured to monitor input power according to one embodiment of the disclosure. For example, the first conductor 112 may be a primary feed of power supplied to a load and the second conductor 120 may be the neutral return feed or another phase feed. In various embodiments, system 100 may be employed at various stages of a power distribution system or within a rack mounted power distribution unit (RPDU) whereby the first conductor 112 is the primary feed, and the second conductor 120 is the return feed.

Figure 1B:
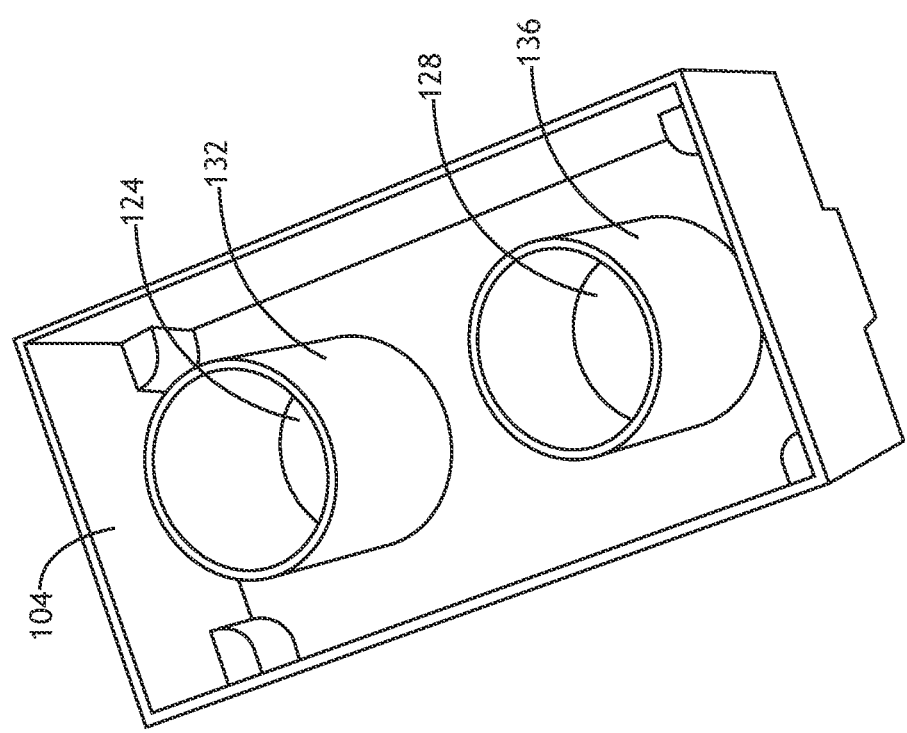
FIG. 1B depicts a diagram of a housing in accordance with an embodiment of the present disclosure.

System 100 may include a housing 104 which may be configured as any type, size, or shape. System 100 may be housed within a singular, compact housing 104. For example, the housing 104 may be configured as a generally rectangular shape with one curved side, such as a tombstone shape as shown in FIG. 1A. In another example, the housing 104 may be shaped as a rectangular prism shape as illustrated in FIG. 1B. The housing 104 may be formed of any type of rigid material including but not limited to plastic, metal, rubber, glass porcelain, or ceramic. For example, the housing may be formed of polylactic acid (PLA) or other 3D printing materials.

Housing 104 may include a first port 124 and a second port 128, the first port 124 and the second port 128 configured to accept the first conductor 112 and the second conductor 120, respectively. The housing 104 may also include a first hollow cylinder 132 and a second hollow cylinder 136 which may further define a border of the first port 124 and the second port 128, respectively. The first hollow cylinder 132 may also provide a surface supporting the first toroidal core 108. For example, the first toroidal core 108 may be configured to have a snug or friction fit around the first hollow cylinder 132, securing the first toroidal core 108 to the housing 104. The second hollow cylinder 136 may provide a surface supporting the second toroidal core 116. For example, a portion of the second toroidal core 116 may have a snug fit, or friction fit, around a portion of the second hollow cylinder 136. A portion of the second toroidal core 116 may also fit around or have a snug fit around the first hollow cylinder 132.

The first hollow cylinder 132 and the second hollow cylinder 136 may be configured as any shape including but not limited to a circle, a square, a triangle, or an oval. For example, the first hollow cylinder 132 and the second hollow cylinder 136 may both be configured as a circle, as shown in FIG. 1A and FIG. 1B. In another example, the second hollow cylinder 136 may be configured as a half circle. For instance, the second hollow cylinder 136 may be configured with a curved side for accommodating the second toroidal core 116, and a flat side that connects each curved end to form the half circle, while still having a diameter wide enough to accommodate the second conductor 120.

The housing 104 may partially or entirely house the components of the system 100. For example, the housing 104 may enclose all but one side of the components of the system 100, leaving one surface uncovered, as shown in FIG. 1A and FIG. 1B. In another example, all sides of the housing 104 may be enclosed. For instance, the housing 104 may totally enclose one or more components of the system 100, with the housing 104 further including a first aperture (e.g., corresponding to the first port 124) configured to facilitate the first conductor 112 as it enters and exits the system 100, and a second aperture (e.g., corresponding to the second port 128) configured to facilitate the second conductor 120 as it enters and exits the system 100. In some embodiments, the housing 104 includes a lid (not shown) through which the first aperture and the second aperture are defined. It is further contemplated that a first aperture corresponding to the first port 124 may be configured to accept at least one of the first conductor 112 or a first conductive element, wherein the first conductive element is configured to couple to the first conductor 112, and a second aperture corresponding to the second port 128 is configured to accept at least one of the second conductor 120 or a second conductive element, wherein the second conductive element is configured to couple to the second conductor 120.

In embodiments, the first toroidal core 108 and second toroidal core 116 may be configured as wire wrapped around a core block, as often found in transformer cores (e.g., the wrapped wire often referred to as a secondary winding). The core block may be configured of any size or shape including but not limited to a circular toroid, an obround toroid, a square toroid, a rectangular toroid, a triangular toroid, or any surface of revolution configured with a hole in the middle, wherein the axis of revolution passes through the hole and does not intersect a surface. For example, the first toroidal core 108 may comprise a core block configured as a circular toroid. In another example, the second toroidal core 116 may be configured as an obround toroid with both the first toroidal core 108 and second toroidal core 116 disposed within the housing 104. In another example, the system 100 may include a first toroidal core 108 configured as a circular toroidal core and a second toroidal core 116 configured as an obround toroidal core.

The core block may be constructed of any material including but not limited to solid iron, carbonyl iron, amorphous steel, silicon steel, amorphous metals, ferrite ceramics, laminated magnetic cores, and/or nanocrystalline metal. For example, the core block of either the first toroidal core 108 or the second toroidal core may include a nanocrystalline alloy. For instance, the core block may be formed from a nanocrystalline ribbon, such as 1K107 nanocrystalline alloy strips.

In embodiments, the first toroidal core 108 may comprise any number of wire windings or any range of windings. For example, the first toroidal core 108 may include windings in a range from 125 to 3200 windings. In another example, the first toroidal core 108 may include windings in a range from 250 to 1600 windings. In another example, the first toroidal core 108 may include windings in a range from 500 to 8000 windings. In another example, the first toroidal core 108 may include windings in a range from 1000 to 4000 windings. In another example, the first toroidal core 108 may include approximately 2000 windings. In another example, the first toroidal core 108 may include approximately 1000 windings. In another example, the first toroidal core 108 may include approximately 3000 windings.

In embodiments, the second toroidal core 116 may comprise any number of wire windings or any range of windings. For example, the second toroidal core 116 may include windings in a range from 32 to 8000 windings. In another example, the second toroidal core 116 may include windings in a range from 64 to 4000 windings. In another example, the second toroidal core 116 may include windings in a range from 125 to 2000 windings. In another example, the second toroidal core 116 may include windings in a range from 250 to 1000 windings. In another example, the second toroidal core 116 may include approximately 500 windings. In another example, the second toroidal core 116 may include approximately 250 windings. In another example, the second toroidal core 116 may include approximately 750 windings. Because the first conductor 112 and the second conductor 120 are considered to have one winding as they pass through the first toroidal core 108 and/or the second toroidal core 116, the windings for the system 100 can also be stated as a ratio. For example, a first conductor 112 passing through a first toroidal core having 2000 windings may be considered as a 2000:1 winding ratio.

The first toroidal core 108 may be configured to operate under any type of electrical current or electrical characteristic (e.g., voltage, power, amperage, resistance, or frequency). For example, the first toroidal core 108 may be configured to operate at a rated current in a range between 5 A and 100 A. For example, the first toroidal core 108 may be configured to operate at a rated current in a range between 10 A and 50 A. For instance, the first toroidal core 108 may be configured to operate with a rated current of up to approximately 30 A.

The second toroidal core 116 may be configured to operate under any type of electrical current or electrical characteristic (e.g., voltage, power, amperage, resistance, or frequency). For example, the second toroidal core 116 may be configured to operate at a rated current in a range between 0 mA and 1000 mA. In another example, the second toroidal core 116 may be configured to operate at a rated current in a range between 20 mA and 500 mA. For instance, the second toroidal core 116 may be configured to operate a rated current of approximately 200 mA.

The first toroidal core 108 and the second toroidal core 116 within the system 100 may be configured to operate at any frequency or any range of frequencies. For example, the first toroidal core 108 and the second toroidal core 116 may be configured to operate at a range of 20 Hz to 400 Hz. In another example, the first toroidal core 108 and the second toroidal core 116 may be configured to operate at a range of 50 Hz to 60 Hz. In another example, the first toroidal core 108 and the second toroidal core 116 may be configured to operate at approximately of 50 Hz. In another example, the first toroidal core 108 and the second toroidal core 116 may be configured to operate at approximately 60 Hz.

The system 100 may be configured for use with any voltage, any voltage type, or any range of voltages. For example, the system 100 may be configured for circuits using 20 VAC to 220 VAC. In another example, system 100 may be configured for circuits using 48 VAC to 120 VAC. In another example, system 100 may be configured for circuits using approximately 110 VAC. In some embodiments, the system 100 is configured for use with VDC circuits.

In embodiments, the system 100 is configured to attach to a surface of an electrical component. The electrical component may be configured as any surface including but not limited to printed circuit boards (PCBs), printed wiring boards (PWBs), and breadboards. For example, the system 100 may be configured to couple, solder, or plug onto a PCB. In another example, the system 100 may be configured to couple to a PCB using a right-angle connector.

Figure 1C:
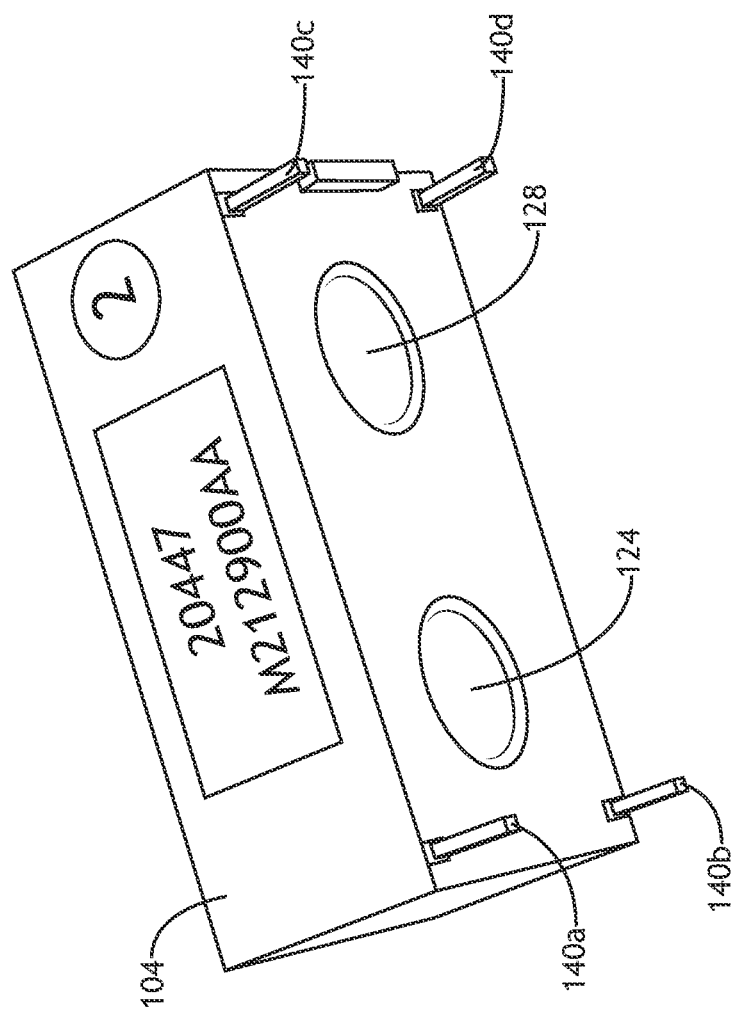
FIG. 1C depicts an external perspective view of the system for measuring current load and residual load within a housing in accordance with an embodiment of the present disclosure.

Referring to FIG. 1C, an external perspective view of the system 100 for measuring current load and residual load within a housing, in accordance with an embodiment of the present disclosure, is shown. In some embodiments, the system 100 includes a plurality of pins 140*a-d* configured to attach to the termini of the first toroidal core 108 and the second toroidal core 116 and configured to couple the system 100 to a PCB or other surface (e.g., the plurality of pins 140*a-d* extend through the housing 104). The plurality of pins 140*a-d* may be of any number or type. For example, the system 100 may contain four pins 140*a*-140*d*. The system 100 may also utilize other methods to secure the housing 104 to the PCB or other surface including but not limited to a screw (e.g., screw terminal), and/or friction or interference fit couplings.

In some embodiments, the system 100 further includes burden resistors operatively connected to each of the coils (e.g., the first toroidal core 108 and the second toroidal core 116). The burden resistors may be physically coupled to the system 100 (e.g., disposed within the housing 104), or may be attached adjacent to the system 100 (e.g., on a PCB or other surface). Burden resistors connected in this manner produce an output voltage proportional to the resistor value, based on the amount of current flowing through it. The measurement of the output voltage may be facilitated via analog-to-digital (ADC) processing.

The burden resistors may be configured for resistance or any range of resistances. For example, the burden resistors may be configured for a rated resistance within a range of 1 to 100 ohms. In another example, the burden resistors may be configured for a rated resistance within a range of 10 to 50 ohms. In another example, the burden resistors may be configured for a rated resistance of 10 ohms. In another example, the burden resistors may be configured for a rated resistance of 25 ohms.

In some embodiments, the system 100 may be configured to be backward compatible with older (e.g., legacy) designs. For example, the system 100 may be configured to replace a one-core load current transformer unit that does not include a residual current core. In another example, the system 100 may be configured to replace a one-core residual current transformer that does not comprise a load current core. The backward compatibility of the system 100 facilitates the addition of a function to an electronic surface (e.g., such as a PCB) without considerable labor and time costs in redesigning the electronic surface to accommodate the extra function (e.g., load current measurement function or residual current measurement function).

Figure 2:
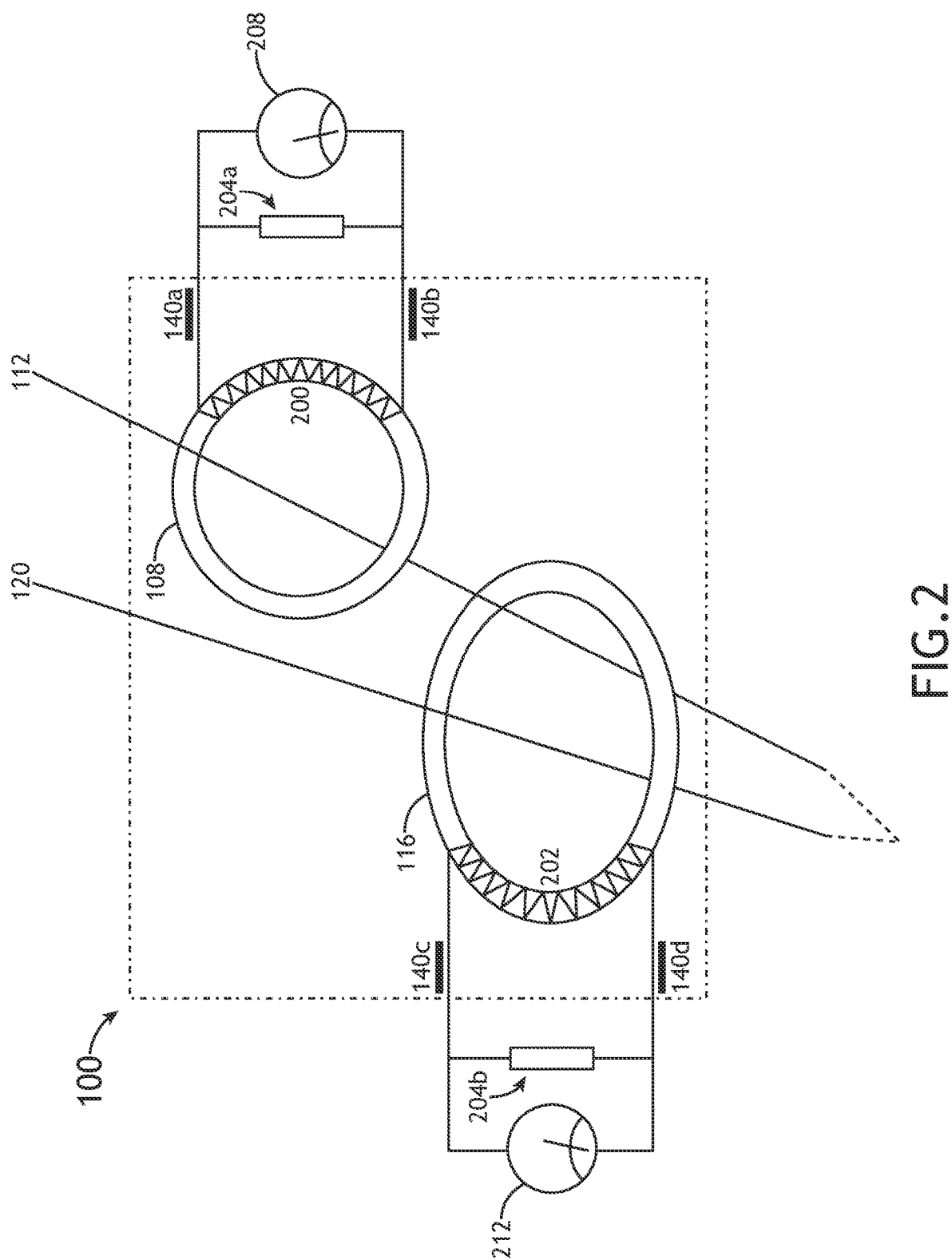
FIG. 2 depicts a diagram illustrating the wiring componentry of the system for measuring current load and residual load in accordance with an embodiment of the present disclosure.

Referring to FIG. 2, a diagram illustrating the wiring componentry of the system 100 for measuring current load and residual load in accordance with an embodiment of the present disclosure is shown. The first toroidal core 108 and the second toroidal core 116 are aligned so that the first conductor 112 may pass through both the first toroidal core 108 and the second toroidal core 116, while the second conductor 120 (e.g., electrically coupled to the first conductor 112) passes through the second toroidal core 116. The first toroidal core 108 and the second toroidal core 116 include a first winding 200 and second winding 202, respectively. The plurality of pins 140a-d are electrically coupled to burden resistors 204a-b. For example, pins 140a and 140b may be coupled to burden resistor 204a, and pins 140c and 140d may be coupled to burden resistor 204b.

In embodiments, first toroidal core 108 and the second toroidal core 116 are electrically coupled to a first detector 208 and second detector 212, respectively. The first detector 208 and the second detector 212 are configured to measure at least one electrical characteristic including but not limited to voltage, current, resistance, and/or power. For example, the first detector 208 and the second detector 212 may be configured as voltmeters. In another example, the first detector 208 and the second detector 212 may be configured as ammeters. The first detector 208 and the second detector 212 may be controlled by, or be electrically coupled to, a controller configured to facilitate the functions of the first detector 208 and the second detector 212. These functions include but are not limited to detection of the at least one electrical characteristic, recording of data corresponding to the at least one electrical characteristic, and/or transmission of data corresponding to the at least one electrical characteristic to a user interface. The controller may contain one or more processors, a memory, and/or a communication interface.

Although the system 100 as shown in FIG. 2 includes the first toroidal core 108 and the second toroidal core 116 and the plurality of pins, other electric componentry may be included in the system 100. For example, in some embodiments, the system 100 includes the one or more burden resistors 204a-b. In another example, the system 100 includes the first detector 208 and/or the second detector 212. In another example, the system 100 includes the controller.

The one or more processors may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory can be an example of tangible, computer-readable storage medium that provides storage functionality to store various data and/or program code associated with operation of the controller and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory is described, a wide variety of types and combinations of memory (e.g., tangible, non-transitory memory) can be employed. The memory can be integral with the controller, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface can be operatively configured to communicate with components of the controller and other components. For example, the communication interface can be configured to retrieve data from the controller or other components, transmit data for storage in the memory, retrieve data from storage in the memory, and so forth. The communication interface can also be communicatively coupled with controller and/or system elements to facilitate data transfer between system components.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include but are not limited to the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:
1. A system comprising:
   a housing defining:
      a first port configured to accept a first conductor; and
      a second port configured to accept a second conductor;
   a first toroidal core disposed within the housing and configured to encircle the first port and the first conductor, the first toroidal core configured to facilitate measurement of a load current; and
   a second toroidal core disposed within the housing and adjacent to the first toroidal core configured to encircle the first port and the second port and thereby further encircle the first conductor and the second conductor, the second toroidal core configured to facilitate measurement of a residual current of a voltage direct current (VDC) circuit, the housing at least partially enclosing the first toroidal core and the second toroidal core.

2. The system of claim 1, further comprising the first and second conductor, wherein the first and second conductor are electrically coupled to the VDC circuit.

3. The system of claim 1, wherein the second toroidal core is configured as an obround toroidal core.

4. The system of claim 1, wherein at least one of the first toroidal core or the second toroidal core comprises a nanocrystalline alloy.

5. The system of claim 1, wherein the housing is configured to enclose the first toroidal core and the second toroidal core, wherein the housing further comprises a first hollow cylinder and a second hollow cylinder, the first hollow cylinder defining a border of the first port, the second hollow cylinder defining a border of the second port.

6. The system of claim 1, further comprising at least two pins configured to connect to two leads of at least one of the first toroidal core or the second toroidal core, the at least two pins further configured to electrically and mechanically couple the system to a wiring board.

7. The system of claim 1, further comprising at least one burden resistor electrically coupled to at least one of the first toroidal core or the second toroidal core.

8. The system of claim 7, wherein the at least one burden resistor is disposed within the housing.

9. The system of claim 1, wherein the first toroidal core is configured as a circular toroidal core.

10. A system comprising:
a housing comprising:
  a first hollow cylinder which is a border of a first port configured to accept a first conductor; and
  a second hollow cylinder which is a border of a second port configured to accept a second conductor;
a first toroidal core disposed within the housing and configured to encircle the first conductor, the first toroidal core configured to facilitate measurement of a load current;
a second toroidal core disposed within the housing and adjacent to the first toroidal core configured to encircle the first conductor and the second conductor, the second toroidal core configured to facilitate measurement of a residual current of a voltage direct current (VDC) circuit, the housing at least partially enclosing the first toroidal core and the second toroidal core; and
at least two pins configured to connect to two leads of at least one of the first toroidal core or the second toroidal core, the at least two pins further configured to electrically and mechanically couple the system to a wiring board.

11. The system of claim 10, further comprising the first and second conductor, wherein the first and second conductor are electrically coupled to the VDC circuit.

12. The system of claim 10, wherein the second toroidal core is configured as an obround toroidal core.

13. The system of claim 10, wherein at least one of the first toroidal core or the second toroidal core comprises a nanocrystalline alloy.

14. The system of claim 10, further comprising at least one burden resistor electrically coupled to at least one of the first toroidal core or the second toroidal core.

15. The system of claim 14, wherein the at least one burden resistor is disposed within the housing.

16. The system of claim 10, wherein the first toroidal core is configured as a circular toroidal core.

17. The system of claim 10, further comprising a first detector coupled to the first toroidal core and configured to measure the load current.

18. The system of claim 10, further comprising a second detector coupled to the second toroidal core and configured to measure the residual current.

19. The system of claim 1, wherein the first toroidal core is configured to facilitate measurement of a load current of the first conductor, and wherein the second toroidal core is configured to facilitate measurement of a residual current of the first conductor and the second conductor.

20. The system of claim 10, wherein the first toroidal core is configured to facilitate measurement of a load current of the first conductor, and wherein the second toroidal core is configured to facilitate measurement of a residual current of the first conductor and the second conductor.

* * * * *